United States Patent [19]

Cunningham et al.

[11] 4,077,116

[45] Mar. 7, 1978

[54] DEVICE FOR FORMING FINNED HEAT TRANSFER TUBES

[75] Inventors: Dean Cunningham, Mattoon; Ralph Goeckner; Marlin Alwardt, both of Effingham; Leon Wohltman, Teutopolis, all of Ill.

[73] Assignee: Fedders Corporation, Edison, N.J.

[21] Appl. No.: 787,796

[22] Filed: Apr. 15, 1977

[51] Int. Cl.² .................. B21D 53/02; B23P 15/26
[52] U.S. Cl. ........................ 29/727; 29/157.3 AH; 72/133
[58] Field of Search .............. 29/727, 726, 157.3 A, 29/157.3 AH, 157.3 B, 564.1, 33 J, 33.5, 33 T; 72/134, 133, 135; 113/118 A; 242/78

[56] References Cited

U.S. PATENT DOCUMENTS

| 1,760,038 | 5/1930 | Bandy | 113/118 A |
| 2,780,268 | 2/1957 | Edwards | 29/157.3 AH |
| 3,652,820 | 3/1972 | Boose | 29/157.3 AH |

Primary Examiner—Milton S. Mehr
Attorney, Agent, or Firm—McAulay, Fields, Fisher & Goldstein

[57] ABSTRACT

An improved device for forming finned heat transfer tubes using a fin structure winding device for winding a fin structure onto a conduit, a coil winder device for winding the finished finned heat transfer tubing into a coil, and at least two substantially parallel and coextensive tubing support means operable to support rotatably a piece of the finned tubing during the winding of the fin structure onto the conduit, and simultaneously to deliver a finished piece of finned heat transfer tubing to the coil winder.

3 Claims, 4 Drawing Figures

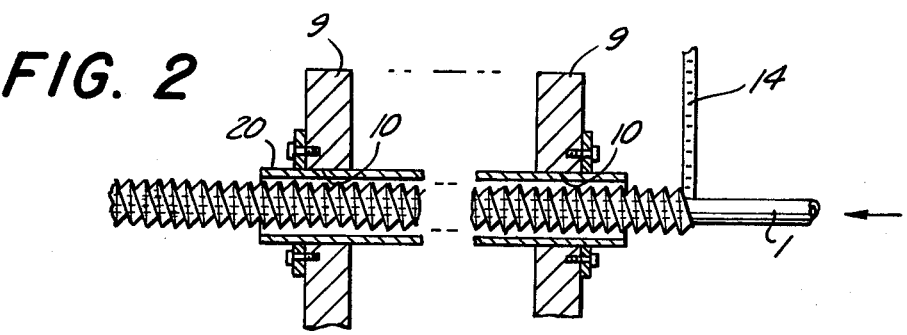
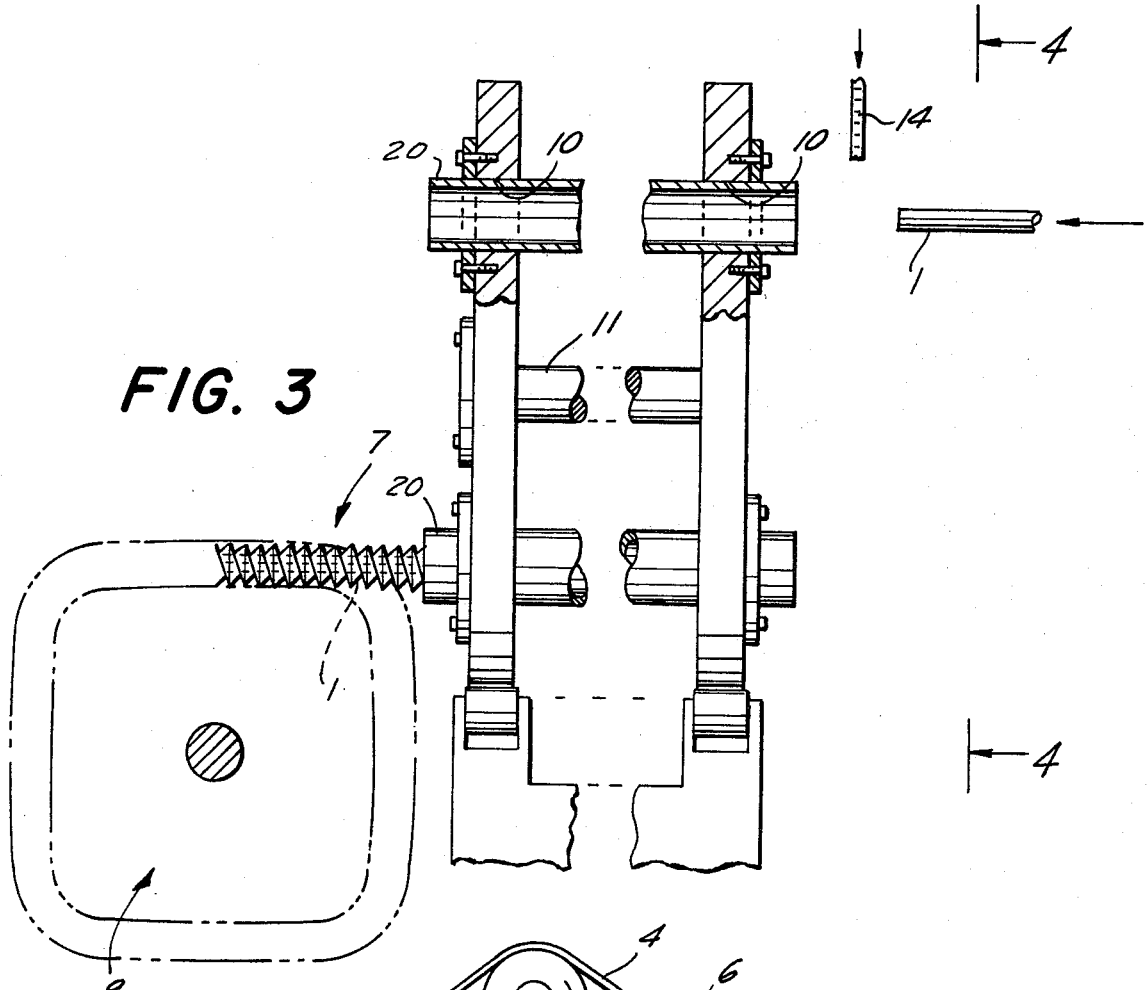
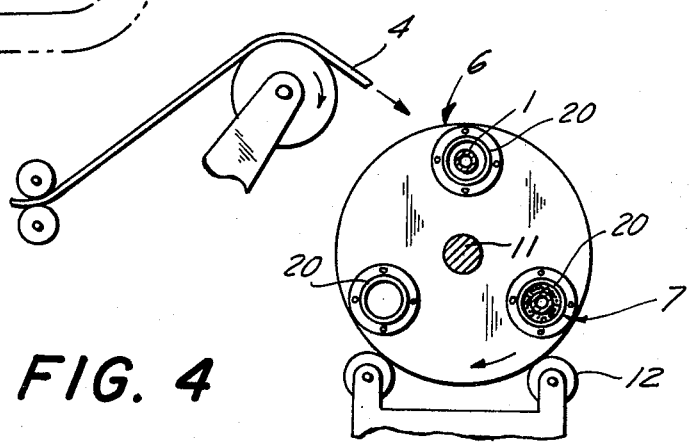

DEVICE FOR FORMING FINNED HEAT TRANSFER TUBES

BACKGROUND OF THE INVENTION

The invention relates to an improvement in a device for forming peices of finned heat transfer tubes and thereafter delivering the finned tubes to a coil winder device.

In order to appreciate more fully the inventive advance of the present invention over the prior art systems, consideration is to be given to a number of related devices over which the present invention is an improvement.

The U.S. Pat. No. 2,865,424 to McElroy for a Machine for Forming Finned Heat Transfer Tubes, teaches a device which can be employed for forming finned heat transfer tubes. A primary object of this reference is to provide cooperating means for simultaneously moving a tube axially while rotating about its axis, the rotation of the tube affecting the wrapping of fin strip stock on the tube, and for deforming the strip as it is coiled on edge about the tube, to insure the creation of a smooth spiral fin which has its inner peripheral edge in proper heat transfer association with the exterior surface of the tube. During wrapping, the tube is merely delivered through a rotatable support which supports the fin portion of the tube to eliminate wear on the fins as the tube is being rotated for wrapping. The McElroy patent does not appear to be concerned with the handling of the tube once it exits the wrapping device.

The U.S. Pat. No. 2,780,268 to Edwards teaches an apparatus for making lipped finned tubing. In this device, after the fins have been secured to the conduit, the assembled finned tubing is delivered to an oven and thereafter to a ledge to be cut into size and finally delivered to a supporting table for packing.

In a U.S. Pat. No. 3,796,389 to Nishiyeri et al, a system is described for winding strips of material into rolls, wherein alternate mandrels are driven by a clutching mechanism which allows changing the mandrel being driven. The clutch means is capable of bringing the power transmitting output shaft into and out of engagement with the driven shafts or mandrels. While the strips of the band plates are being wound by one of the driven shafts which is in driving engagement with the driving means, the other of the driven shafts is held stationary, that is, comes out of engagement with the driving means so that the coils therearound, if any, can be bound up with a suitable strap and thereafter separated therefrom during the winding of the band plates by one of the driven shafts. This patent contemplates the use of a clutching mechanism capable of engaging one of several shafts to drive the shaft whereby thin band plates may be wound about the shaft. The present invention is concerned with an improved machine or device for forming finned heat transfer tubes and is not concerned with various clutching mechanisms for alternately driving shafts for winding thin band plates into rolls. The Nishiyeri et al patent is cited as an example of a prior art winding apparatus, in general.

Several additional patents which are of interest in showing the prior art are Bundy U.S. Pat. No. 1,720,508; Bishop et al U.S. Pat. No. 2,702,166; Nihlen U.S. Pat. No. 3,568,288; and Boose U.S. Pat. No. 3,652,820.

The Bundy patent is directed to the formation of tubing from flat stock, followed by the soldering of fin material to the tubing. No description of a system, according to the instant invention as will be described below, is shown in this patent.

In Bishop et al, a fin is wrapped about a piece of already formed tubing, the machine automatically stopping when wrapping has been completed for removal of the tube from the machine.

Nihlen shows the grooving of a tube to accommodate a thin strip and the forcing of a thin strip into that groove while expanding portions of it. Similarly, in Boose, an L-shaped fin is helically wound onto a tube and welded into place.

SUMMARY OF THE INVENTION

It is an object of the present invention to provide apparatus permitting the manufacture of a relatively long piece of finned heat exchange tubing while reducing the required amount of space for producing and handling such items.

Further objects and advantages of the invention will be set forth in part in the following specification and in part will be obvious therefrom without being specifically referred to, the same being realized and attained as pointed out in the claims hereof.

In general, the present invention is concerned with an improved device for forming and handling finned heat transfer tubing wherein a plain piece of tubing is placed on the entrance tables to the device and fed to a roll mill where the metallic fin material is formed and wrapped about the tubing. As the tubing is being wrapped, it is fed to a holding device which supports and holds the wrapped portion of the tubing until the complete piece is wrapped. The holding device thereafter rotates to align a new holding device with the roll mill while simultaneously aligning the finished wrapped tubing with a coil winder. While the new plain piece of tubing is being wrapped and fed into the tubing support means or holding device, the previously wrapped portion can be drawn out of the tubing support and onto a coil winder.

The invention accordingly comprises the features of construction, combination of elements and arrangement of parts which will be exemplified in construction hereinafter set forth and the scope of the application of which will be indicated in the claims.

BRIEF DESCRIPTION OF THE DRAWINGS

For a fuller understanding of the nature and objects of the invention, reference should be had to the following detailed description, taken in connection with the accompanying drawings, in which:

FIG. 2 is a partial sectional view of the device of FIG. 1, showing details of a fin being wrapped on a tube;

FIG. 3 is a partial sectional view of the device of FIG. 1 showing details of a piece of finned tubing being fed to a coil winding device; and FIG. 4 is a plan view of the device of FIG. 3 taken along the line 4—4.

DESCRIPTION OF THE PREFERRED EMBODIMENT

Figure 1:
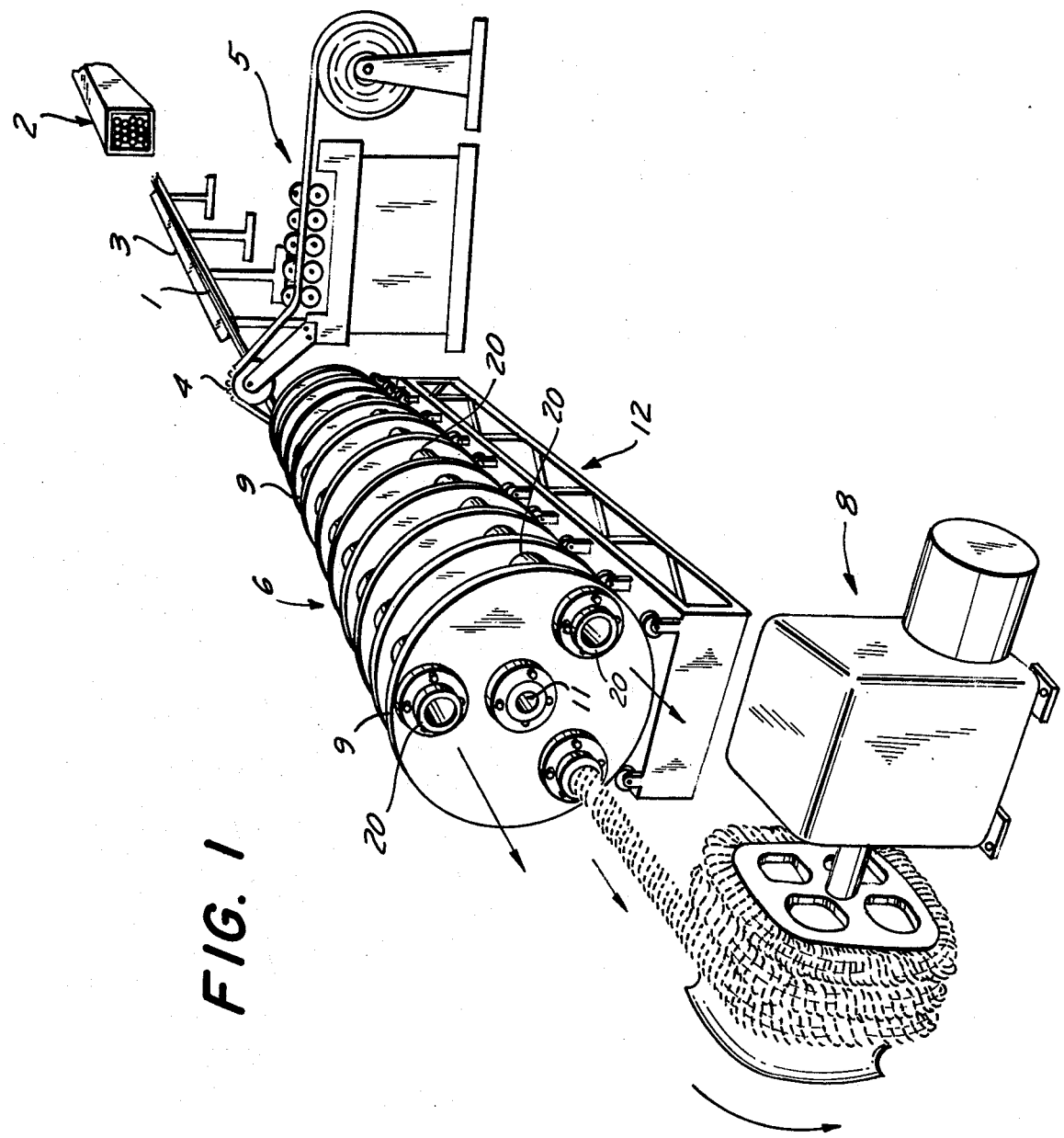
FIG. 1 is a perspective view of the improved device according to the present invention.

Referring now more particularly to the FIG. 1, a piece of tubing 1 is supplied from a supply 2 to a feed table 3 and is provided with a finned structure 4, most usually by means of a finned structure winding device 5.

The device 5 may be any known device for continuously providing a finned structure 4 to a piece of tubing 1.

As the tubing 1 is provided with the finned structure 4, it is fed into a support structure 6 which supports and stores the piece of tubing 1 during the application of the finned structure 4.

Once the complete piece of tubing 1 has been provided with the finned structure 4, the support structure 6 is rotated to simultaneously align the completed tubing 7 with a coil winder 8. The completed tubing may then be wound on the coil winder 8.

For the preferred embodiments shown in FIG. 1, the support structure is composed of spaced apart discs 9 which are secured together in a substantially parallel manner and which have openings 10 aligned in the dics 9 to form several rows of openings 10, a tube 20 being mounted in each set of openings 10 to support the completed tubing 7 as it leaves the winding device 5 and as it is being taken up on the coil winder 8. FIG. 1 shows three rows of such openings 10 and three tubes 20. However, this number is set, according to the present description, only by construction considerations and only two rows of openings 10 and tubes 20 are required, though more than three can also be employed. The requirement of a minimum of two such tubes 20 is required by the necessity for one tube 20 to receive the completed tubing 7 as it is being fed from the winding device 5, and a second to support the completed tubing 7 being wrapped on the coil winder 8. The specific placement of the coil winder 8 is not critical, so long as it is properly placed to take up a completed tubing piece 7.

FIG. 3 shows details of a completed piece of tubing 7 being fed to a coil winder 8 while a new piece of tubing 1 is being fed towards another tube 20. The finned structure 4 will be wrapped on the tubing 1 before it is fed into the tube 20. This operation can also be seen from FIG. 4 which shows the finned tubing 4 being fed towards the incoming new piece of tubing 1 while the completed tubing 7 is being fed out of the support structure 6.

The support structure 6 is shown as a series of discs 9 supported on a central axis 11 and a support device 12 on which the structure 6 may be rotated. Again, this particular construction is a convenient one to produce. However, clearly the tubes 20 can be formed in a solid support device which is square or hexagonal or any other convenient shape. The tubes 20 can be replaced with any equivalent structure operable to support the tubing 1 while it is being wrapped or otherwise provided with a fin structure 4.

The advantages of this type of structure are easily seen by the workers in this art. The amount of space required for handling the tubing can be reduced considerably over that usually required by prior art methods. The same floor space is utilized for preparation and for storage and transporting to a coil winder, thereby greatly reducing the required floor space for production and handing of the fin structure 7.

It is to be understood that the invention as described is a preferred embodiment and it is not desired to be limited to the exact details of construction shown and described, for obvious modifications will occur to a person skilled in the art. Some of the possible modifications have been discussed above by way of illustration.

Having thus described the invention, what is claimed as new and is desired to be secured by Letters Patent is as follows:

1. In a device for forming finned heat transfer tubing, the device being of the type employing a fin structure winding device for winding a fin structure onto a conduit to form a piece of finned heat transfer tubing, a coil winder device for winding the finned heat transfer tubing into a coil, and a support structure operable to support the finned heat transfer tubing while it is being produced and to thereafter supply the heat transfer tubing to the coil winder; the improvement comprising:

at least two substantially parallel and coextensive tubing support means operable to support a piece of finned tubing and being coupled together to form said support structure, said tubing support means being disposed about a central axis equally rotationally spaced apart from each other and said axis whereby rotation of the support structure about said axis will interchange the positions of the support means;

said fin structure winding device having a direction of feed for the conduit substantially parallel to the tubing support means and operable to feed the finned heat transfer tubing formed by the fin structure winding device into one said tubing support means; and the coil winding means disposed near a second said tubing support means which is rotationally next to said one tubing support means and operable to receive finned tubing from said second support means, for coiling.

2. In a device as claimed in claim 1 wherein said support structure comprises a plurality of support structure pieces disposed in a row on said central axis and being spaced apart from each other, each said support structure piece defining at least two apertures therethrough which apertures are substantially aligned with corresponding apertures in adjacent support structure pieces to form at least two substantially parallel and coextensive rows of apertures each of which rows define a tubing support, a tube being supported within each row of apertures.

3. In a device as claimed in claim 2 wherein said support structure pieces are discs.

* * * * *